(12) United States Patent
Liu et al.

(10) Patent No.: US 12,283,079 B2
(45) Date of Patent: Apr. 22, 2025

(54) METHOD, DEVICE, AND COMPUTER PROGRAM PRODUCT FOR VIDEO RETRIEVAL

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 18/129,949

(22) Filed: Apr. 3, 2023

(65) Prior Publication Data

US 2024/0290062 A1   Aug. 29, 2024

(30) Foreign Application Priority Data

Feb. 28, 2023 (CN) .......................... 202310183124.7

(51) Int. Cl.
| | |
|---|---|
| *H04N 21/239* | (2011.01) |
| *G06F 16/78* | (2019.01) |
| *G06V 10/40* | (2022.01) |
| *H04N 21/231* | (2011.01) |
| *H04N 21/8405* | (2011.01) |

(52) U.S. Cl.
CPC .......... *G06V 10/40* (2022.01); *G06F 16/7867* (2019.01); *H04N 21/8405* (2013.01)

(58) Field of Classification Search
CPC .......................... G06V 10/40; G06F 16/7867
See application file for complete search history.

(56) References Cited

U.S. PATENT DOCUMENTS

| | | | |
|---|---|---|---|
| 10,178,422 B1* | 1/2019 | Panchaksharaiah | ... G11B 27/00 |
| 2014/0282636 A1* | 9/2014 | Petander | .......... H04N 21/41407 725/1 |

OTHER PUBLICATIONS

M. Gygli et al., "Creating Summaries from User Videos," European Conference on Computer Vision, Sep. 2014, pp. 505-520.
R. Laganière et al., "Video Summarization from Spatio-Temporal Features," Proceedings of the 2nd ACM TRECVid Video Summarization Workshop, Oct. 2008, pp. 144-148.

(Continued)

*Primary Examiner* — Rong Le
(74) *Attorney, Agent, or Firm* — Ryan, Mason & Lewis, LLP

(57) ABSTRACT

Embodiments of the present disclosure relate to a method, a device, and a computer program product for video retrieval. The method includes determining a retrieval level corresponding to a retrieval word in response to receiving a retrieval request including the retrieval word from a client. The method further includes determining a video database corresponding to the retrieval level among a plurality of video databases, where the plurality of video databases store image frames for different frame rates of the same video. The method further includes retrieving an image frame associated with the retrieval word from the determined video database and sending the retrieved image frame to the client. According to the solution, multi-level video retrieval can be realized, allowing a user to retrieve a desired video in different scenes or different devices at different retrieval speeds, so as to provide the user with a more flexible video retrieval mode.

20 Claims, 5 Drawing Sheets

(56) References Cited

OTHER PUBLICATIONS

Y.-F. Ma et al., "A User Attention Model for Video Summarization," Proceedings of the Tenth ACM international Conference on Multimedia, Dec. 2002, pp. 533-542.

M. Gygli et al., "Video Summarization by Learning Submodular Mixtures of Objectives," IEEE Conference on Computer Vision and Pattern Recognition (CVPR), Jun. 2015, pp. 3090-3098.

B. Zhao et al., "Quasi Real-Time Summarization for Consumer Videos," IEEE Conference on Computer Vision and Pattern Recognition, Jun. 2014, 8 pages.

D. Potapov et al., "Category-specific Video Summarization," ECCV—European Conference on Computer Vision, Sep. 2014, 16 pages.

K. Zhang et al., "Summary Transfer: Exemplar-based Subset Selection for Video Summarization," 2016 IEEE Conference on Computer Vision and Pattern Recognition (CVPR), Mar. 2016, pp. 1059-1067.

K. Zhang et al., "Video Summarization with Long Short-term Memory," arXiv:1605.08110v2, Jul. 29, 2016, 24 pages.

J. Fajtl et al., "Summarizing Videos with Attention," arXiv:1812.01969v2, Feb. 21, 2019, 16 pages.

Y. Jung et al., "Discriminative Feature Learning for Unsupervised Video Summarization," The Thirty-Third AAAI Conference on Artificial Intelligence, No. 1047, Jan. 2019, pp. 8537-8544.

Y. Song et al., "TVSum: Summarizing Web Videos Using Titles," IEEE Conference on Computer Vision and Pattern Recognition (CVPR), Jun. 2015, pp. 5179-5187.

Cisco, "Cisco Visual Networking Index: Forecast and Trends, 2017-2022" White Paper, https://www.cisco.com/c/en/us/solutions/collateral/service-provider/visual-networking-indexvni/complete-white-paper-c11-481360.html, Feb. 2019, 38 pages.

A. Karpathy et al., "Deep Visual-Semantic Alignments for Generating Image Descriptions," IEEE Conference on Computer Vision and Pattern Recognition, arXiv:1412.2306v2, Apr. 14, 2015, 17 pages.

A. Radford et al., "Learning Transferable Visual Models From Natural Language Supervision," International Conference on Machine Learning, arXiv:2103.00020v1, Feb. 26, 2021, 48 pages.

U.S. Appl. No. 18/127,416 filed in the name of Zhisong Liu et al. on Mar. 28, 2023, and entitled "Method, Electronic Device, and Computer Program Product for Extracting Target Frame."

* cited by examiner

METHOD, DEVICE, AND COMPUTER PROGRAM PRODUCT FOR VIDEO RETRIEVAL

RELATED APPLICATION

The present application claims priority to Chinese Patent Application No. 202310183124.7, filed Feb. 28, 2023, and entitled "Method, Device, and Computer Program Product for Video Retrieval," which is incorporated by reference herein in its entirety.

FIELD

Embodiments of the present disclosure relate to video technologies and, more specifically, to a method, a device, and a computer program product for video retrieval.

BACKGROUND

With its ongoing rapid development, streaming media has become an important medium for the public to obtain entertainment, information, and other content, and the public spends more and more time browsing the content of streaming media. At present, videos account for most of global Internet traffic. Due to a very large increase in the quantity of videos available to watch and differences in length between videos, quick preview of the videos is important for a user to get to know about the video content. To enable a user to quickly acquire global information of the video content, a form of video abstract can be used, that is, a key frame of the video can be extracted. However, at present, most video abstracts are only aimed at a fixed-length video abstract, which cannot provide the user with more flexible video retrieval.

SUMMARY

Embodiments of the present disclosure provide a solution for video retrieval.

In a first aspect of the present disclosure, a method for video retrieval is provided, including: determining a retrieval level corresponding to a retrieval word in response to receiving a retrieval request including the retrieval word from a client; determining a video database corresponding to the retrieval level among a plurality of video databases, where the plurality of video databases store image frames for different frame rates of the same video; retrieving an image frame associated with the retrieval word from the determined video database; and sending the retrieved image frame to the client.

In a second aspect of the present disclosure, an electronic device is provided, including a processor and a memory coupled to the processor, where the memory has instructions stored therein which, when executed by the processor, cause the electronic device to perform actions including: determining a retrieval level corresponding to a retrieval word in response to receiving a retrieval request including the retrieval word from a client; determining a video database corresponding to the retrieval level among a plurality of video databases, where the plurality of video databases store image frames for different frame rates of the same video; retrieving an image frame associated with the retrieval word from the determined video database; and sending the retrieved image frame to the client.

In a third aspect of the present disclosure, a computer program product is provided. The computer program product is tangibly stored on a non-transitory computer-readable medium and includes machine-executable instructions, where the machine-executable instructions, when executed by a machine, cause the machine to execute the method according to the first aspect of the present disclosure.

It should be noted that this Summary is provided to introduce the selection of concepts in a simplified manner, which will be further described in the detailed description below. The Summary is neither intended to identify key features or major features of content of the present disclosure, nor intended to limit the scope of the content of the present disclosure.

BRIEF DESCRIPTION OF THE DRAWINGS

By further detailed description of example embodiments of the present disclosure, provided herein with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Figure 1:
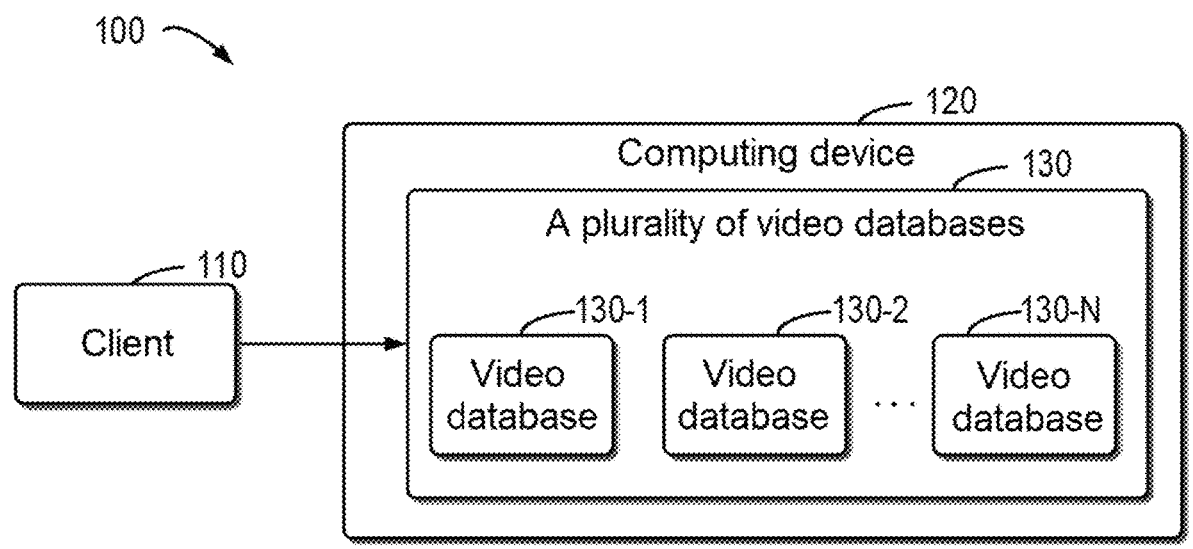
FIG. 1 shows a schematic diagram of an example environment in which a plurality of embodiments of the present disclosure can be implemented.

Illustrative embodiments of the present disclosure will be described in more detail below with reference to the accompanying drawings. Although the accompanying drawings illustrate certain embodiments of the present disclosure, it should be understood that the present disclosure can be implemented in various forms and should not be limited by the embodiments described herein. Instead, these embodiments are provided to enable a more thorough and complete understanding of the present disclosure.

The term "include" and its variants as used herein mean open-ended inclusion, i.e., "including but not limited to." The term "based on" means "based at least in part on." The term "one embodiment" means "at least one embodiment." The term "another embodiment" indicates "at least one additional embodiment." Relevant definitions of other terms will be given in the description below.

The ongoing substantial growth in the quantity of videos available for watching has led to a continuously increasing demand by users to be able to browse and retrieve videos quickly. To enable users to grasp global information of video content, one of the approaches that can be taken is automatic video abstract or key frame extraction. This approach selects the most representative image frame from a video as a key frame to summarize key information of the whole video. When a user performs video retrieval in face of a very large number of available videos, a retrieval word associated with the key information of the video can be used to retrieve an image frame corresponding to the retrieval word, and then the original video can be located according to the retrieved image frame.

The definition of the key information and the adaptive compactness of the key frame are major challenges for video abstract techniques. For the definition of the key information, the user is more concerned about semantic meaning of the video, so that it is very important to identify a key person or object from the video and to keep an image frame having a key action. For the latter, the fun and representativeness of an image frame are related from one image frame to another. The purpose of video abstract is to select a subset of image frames from the original video. The higher a frame rate is, and the higher an abstraction level is, the more information the video abstract will lose. Compared with a fixed frame rate method, adaptive video abstract is more popular in practical application. However, at present, most video abstract methods are limited to fixed-length videos, and cannot extract multi-level feature representations for video understanding.

To at least partially address the above and other potential problems, embodiments of the present disclosure provide a method for video retrieval. For example, the method in an illustrative embodiment retrieves an image frame associated with a retrieval word from a video database corresponding to a retrieval level of the retrieval word based on the retrieval level of the retrieval word. The method determines a retrieval level corresponding to a retrieval word in response to receiving a retrieval request comprising the retrieval word from a client. According to the determined retrieval level, the method determines a video database corresponding to the retrieval level among a plurality of video databases, where the plurality of video databases separately store image frames for different frame rates of the same video. And then, the method retrieves an image frame associated with the retrieval word from the determined video database and send the retrieved image frame to the client.

In some embodiments of the present disclosure, after an original video is received, a first frame rate is used for extracting image frames from the received video, and a second frame rate is used to extract image frames from the received video. The extracted image frames of the first frame rate are stored into a first video database corresponding to a first retrieval level, and the extracted image frames of the second frame rate are stored into a second video database corresponding to a second retrieval level.

After the original video is acquired, the image frames for the different frame rates of the original video are separately stored in different video databases. In response to a retrieval level corresponding to a retrieval word, this solution can retrieve an image frame corresponding to the retrieval word from the video database corresponding to the retrieval level, and feed the image frame back to the user. The user can select the most desired search result from the retrieved image frame (for example, the image frame most relevant to the retrieval word of the user), and then locate the original video through the search result.

The solution of the present disclosure provides multi-level video abstract, which can feed a video retrieval result back to the user at different retrieval speeds according to the retrieval level of the retrieval word, so as to provide the user with a more flexible video retrieval mode and improve video retrieval efficiency.

Basic principles and several example embodiments of the present disclosure are illustrated below with reference to FIG. 1 to FIG. 7. It should be understood that these example embodiments are given only to enable those skilled in the art to better understand and thus implement embodiments of the present disclosure, and are not intended to limit the scope of the present disclosure in any way.

FIG. 1 illustrates example environment 100 in which a device and/or a method according to embodiments of the present disclosure may be implemented. As shown in FIG. 1, example environment 100 includes client 110 and computing device 120.

Using client 110, a user sends a retrieval request including a retrieval word to computing device 120. Client 110 may include, for example, a mobile communication device, a tablet computer, a notebook computer, a desktop computer, or the like. In response, computing device 120 may determine a video database corresponding to the retrieval word from a plurality of video databases 130 according to the retrieval level corresponding to the retrieval word, where the plurality of video databases 130 include video database 130-1, video database 130-2, video database 130-N, etc., which separately store image frames for different frame rates of the same video, and retrieve an image frame associated with the retrieval word from the determined video database, so as to send the retrieved image frame to client 110. Client 110 may select an image frame mostly desired by the user according to the received image frame, and then acquire the original video where the most desired image frame is located according to the most desired image frame.

In some embodiments, after receiving the original video, computing device 120 may extract the image frames from the received original video at different frame rates, and separately store the extracted image frames of the different frame rates into video databases corresponding to different retrieval levels, for video retrieval operations in response to retrieval requests. For example, a video database corresponding to a relatively low retrieval level may store image frames of a relatively small frame rate. When the user needs to acquire a retrieval result as soon as possible, computing device 120 may retrieve the image frame corresponding to the retrieval word from this video database. A video database corresponding to a relatively high retrieval level can store image frames of a relatively large frame rate. When the user needs to obtain a more accurate retrieval result, computing device 120 may retrieve an image frame corresponding to the retrieval word from this video database. In some other embodiments, computing device 120 may further acquire a mapping relationship between image frames and keywords describing the image frames, and by using the mapping relationship, an image frame associated with a retrieval word may be retrieved.

For example, computing device 120 includes, but is not limited to, a desktop computer, a server computer, a tablet computer, a laptop computer, a smart phone, a personal digital assistant (PDA), a server, etc. In addition, although illustrated as a single device, computing device 120 may also be a plurality of devices, a virtual device, or any other form of devices suitable for implementing embodiments of the present disclosure.

The architecture and functions in example environment 100 are described for illustrative purposes only, and do not imply any limitation to the scope of the present disclosure. There may also be other devices, systems, or components that are not shown in environment 100. Furthermore, embodiments of the present disclosure may also be applied to other environments having different structures and/or functions.

Figure 2:
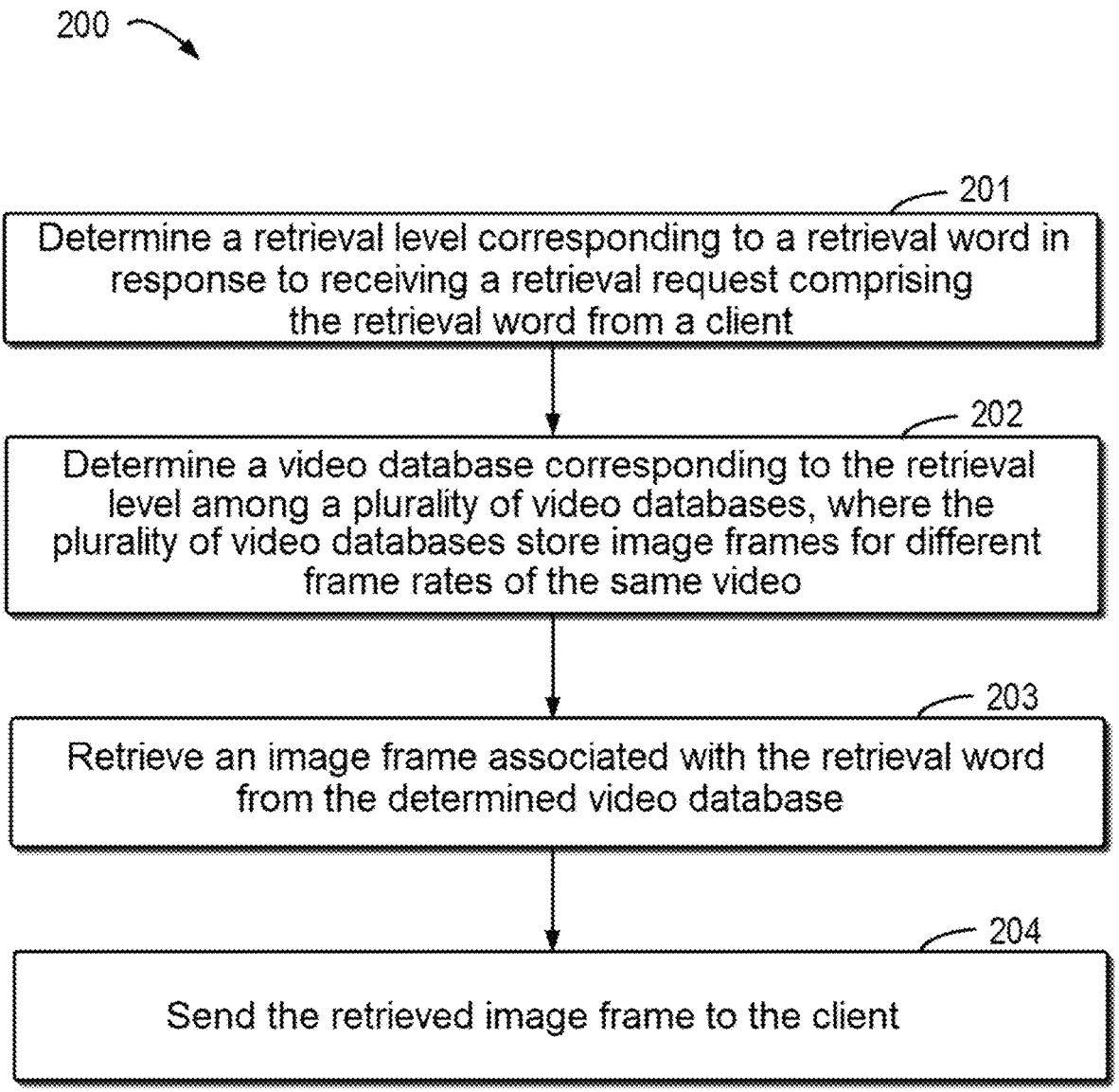
FIG. 2 illustrates a flow chart of a method for video retrieval according to an embodiment of the present disclosure.

FIG. 2 illustrates a flow chart of example method 200 for video retrieval according to some embodiments of the present disclosure. Example method 200 may be executed by computing device 120 as shown in FIG. 1. It should be understood that method 200 may also include additional actions not shown, and the scope of the present disclosure is not limited in this regard. Method 200 is described in detail below in conjunction with example environment 100 of FIG. 1.

In block 201, a retrieval level corresponding to a retrieval word is determined in response to receiving a retrieval request including the retrieval word from client 110. For example, when receiving the retrieval request including the retrieval word from client 110, computing device 120 may determine that the retrieval level corresponding to the retrieval word is a first retrieval level; or when receiving the retrieval request including the retrieval word from client 110, computing device 120 may determine that the retrieval level corresponding to the retrieval word is a second retrieval level.

In some embodiments, determining a retrieval level corresponding to a retrieval word may include: determining a retrieval level corresponding to the retrieval word from a plurality of retrieval levels. For example, the plurality of retrieval levels may at least include a first retrieval level and a second retrieval level, and the first retrieval level and the second retrieval level may correspond to different video databases, respectively.

In some embodiments, the first retrieval level may correspond to a retrieval word only including a single word, such as "crowd," the second retrieval level may correspond to a retrieval word including a plurality of words, such as "train" and "concert," that is, when receiving a retrieval request only including the retrieval word "crowd," computing device 120 may determine that the retrieval level corresponding to the retrieval word is the first retrieval level, and thus may determine the video database corresponding to the first retrieval level; and when receiving a retrieval request including retrieval words "train" and "concert," computing device 120 may determine that the retrieval level corresponding to the retrieval words is the second retrieval level, and thus may determine the video database corresponding to the second retrieval level.

In some other embodiments, the first retrieval level may correspond to a retrieval word only including phrases, such as "crowd," "train," "concert," etc., and the second retrieval level may correspond to a retrieval word including short sentences, such as "musicians are playing musical instruments" and "the audience is happy," etc.

In some other embodiments, the plurality of retrieval levels may at least include a first retrieval level, a second retrieval level, and a third retrieval level, and the first retrieval level, the second retrieval level, and the third retrieval level may correspond to different video databases, respectively. For example, the first retrieval level may correspond to a retrieval word only including a single phrase, for example, the retrieval word is "crowd." The second retrieval level may correspond to a retrieval word including a plurality of phrases, for example, the retrieval word is "train" and "concert." The third retrieval level may correspond to a retrieval word including short sentences, for example, the retrieval word is "musicians are playing musical instruments" and "the audience is happy."

It should be understood that the correspondence between the retrieval levels and retrieval word types is only illustrative, and this disclosure does not impose any restriction on the correspondence between the retrieval levels and the retrieval word types, the quantity of the retrieval levels, etc.

In block 202, a video database corresponding to the retrieval level is determined among a plurality of video databases, where the plurality of video databases store image frames for different frame rates of same videos.

In some embodiments, computing device 120 may include a plurality of video databases 130, where the plurality of video databases 130 may store image frames for different frame rates of the same video, and for example, for the same original video, computing device 120 may perform multi-level video abstract processing on the original video, and may extract image frames at a first frame rate and extract image frames at a second frame rate. A first video database in the plurality of video databases 130 may store the image frames for the first frame rate of the same original video, and a second video database in the plurality of video databases 130 may store the image frames for the second frame rate of the same original video. After determining a retrieval level corresponding to the retrieval word, computing device 120 may determine a video database corresponding to the retrieval level from the plurality of video databases 130. The mode in which computing device 120 performs multi-level video abstract processing on the same original video will be described in detail in conjunction with FIG. 3 below.

In some embodiments, the quantities of image frames for different frame rates of the same video may be different. For example, the quantity of the image frames for the first frame rate of the same video may be less than the quantity of the image frames for the second frame rate of the same video. That is, the quantity of the image frames for the first frame rate of the same video stored in the first video database is less than the quantity of the image frames for the second frame rate of the same video stored in the second video database.

In some embodiments, the plurality of video databases 130 may correspond to different retrieval levels, respectively, for example, a first video database in the plurality of video databases 130 may correspond to the first retrieval level, and a second video database in the plurality of video databases 130 may correspond to the second retrieval level. When determining that a corresponding retrieval level is the first retrieval level according to the retrieval word, computing device 120 may determine the first video database from the plurality of video databases 130 for subsequent retrieval of the image frame; and when determining that a corresponding retrieval level is the second retrieval level according to the retrieval word, computing device 120 may determine the second video database from the plurality of video databases 130 for subsequent retrieval of the image frame.

In some other embodiments, the plurality of video databases 130 may further include a third video database. For the same original video, computing device 120 may further extract image frames at a third frame rate, and the extracted image frames for the third frame rate are stored in the third video database. The first video database, the second video database, and the third video database may store the image frames for the first frame rate, the second frame rate, and the third frame rate, respectively. The quantity of the image frames for the first frame rate of the same video stored in the first video database may be less than the quantity of the image frames for the second frame rate of the same video stored in the second video database, and the quantity of the image frames for the second frame rate of the same video stored in the second video database may be less than the quantity of the image frames for the third frame rate of the same video stored in the third video database. In addition, the first video database, the second video database, and the third video database may correspond to the first retrieval level, the second retrieval level, and the third retrieval, respectively. When determining that a corresponding retrieval level is the first retrieval level according to the retrieval word, computing device 120 may determine the first video database from the plurality of video databases 130 for subsequent retrieval of the image frame; when determining that a corresponding retrieval level is the second retrieval level according to the retrieval word, computing device 120 may determine the second video database from the plurality of video databases 130 for subsequent retrieval of the image frame; and when determining that a corresponding retrieval level is the third retrieval level according to the retrieval word, computing device 120 may determine the third video database from the plurality of video databases 130 for subsequent retrieval of the image frame.

It should be understood that the correspondence between the retrieval levels and the video databases is only illustrative, and the present disclosure does not impose any restriction on the correspondence between the retrieval levels and the video databases, classification of the video databases, etc.

In block 203, the image frame associated with the retrieval word is retrieved from the determined video database. In some embodiments, when determining the video database for retrieval based on the retrieval level corresponding to the retrieval word, computing device 120 may retrieve an image frame associated with the retrieval word from the determined video database.

In some embodiments, when determining the first video database corresponding to the first retrieval level based on the first retrieval level corresponding to the retrieval word, computing device 120 may retrieve an image frame associated with the retrieval word from the first video database. When determining the second video database corresponding to the second retrieval level based on the second retrieval level corresponding to the retrieval word, computing device 120 may retrieve an image frame associated with the retrieval word from the second video database.

For example, when client 110 sends a retrieval request only including the retrieval word "crowd" to computing device 120, computing device 120 may determine that the retrieval word only including "crowd" corresponds to the first retrieval level, then determine that the first retrieval level corresponds to the first video database in the plurality of video databases 130, and retrieve an image frame associated with "crowd" from the first video database. When client 110 sends a retrieval request including the retrieval word "train" and "concert" to computing device 120, computing device 120 may determine that the retrieval word including "train" and "concert" corresponds to the second retrieval level, then determine that the second retrieval level corresponds to the second video database in the plurality of video databases 130, and retrieve an image frame associated with "train" and "concert" from the second video database.

In some embodiments, retrieving the image frame associated with the retrieval word from the determined video database includes determining a keyword associated with the retrieval word, and retrieving the image frame corresponding to the keyword from the determined video database.

When the user performs video retrieval, the input retrieval word and the keyword describing the image frame may not be completely the same. According to the input retrieval word, computing device 120 may first determine the keyword associated with the retrieval word, and then retrieve the image frame corresponding to the keyword from the video database according to the keyword. Therefore, even if the user inputs a relatively fuzzy retrieval word, the image frame desired by the user may still be retrieved.

For example, "associated with" may refer to that the input retrieval word is semantically similar to the keyword describing the image frame. For example, when the input retrieval word is "vocal concert," computing device 120 may determine that the keyword associated with the retrieval word is "concert," and then retrieve the image frame corresponding to "concert" from the first video database associated with the first retrieval level based on the first retrieval level corresponding to "vocal concert." Certainly, computing device 120 may automatically correct a typo of the retrieval word. For example, when the input retrieval word is "conzert," computing device 120 may determine that the keyword associated with the retrieval word "conzert" is "concert," and then retrieve the image frame corresponding to "concert" from the video database.

In block 204, the retrieved image frame is sent to the client. In some embodiments, when retrieving the image frame associated with the retrieval word, computing device 120 may send the retrieved image frame to client 110. The sent image frame may be one image frame or a plurality of image frames, the user may select the most desired image frame from the received image frame, and then obtain the original video of the image frame by examining the image frame.

In this way, multi-level video retrieval can be realized, allowing the user to retrieve the desired video in different scenes or different devices at different retrieval speeds, and thus providing the user with a more flexible video retrieval mode. For example, when the user wants to quickly obtain a retrieval result, a retrieval word corresponding to a relatively low retrieval level (such as a retrieval word including a relatively simple word) may be input, and the computing device may retrieve an image frame from the video database corresponding to the relatively low retrieval level. Since the quantity of the image frames of the same video stored in the video database corresponding to the relatively low retrieval level is small, the computing device may quickly retrieve the image frame associated with the retrieval word, and thus feed the retrieval result back to the user. On the contrary, when the user wants to obtain a more accurate retrieval result, a retrieval word corresponding to a relatively high retrieval level (for example, a retrieval word including a more complex short sentence) may be input, and the computing device may retrieve an image frame from the video database corresponding to the relatively high retrieval level. Since the quantity of the image frames of the same video stored in the video database corresponding to the relatively high retrieval level is large, a retrieval speed of the computing device is relatively slow, but more complete video information can be fed back to the user, so as to be closer to the retrieval result desired by the user.

Example architecture 300 for multi-level video abstract according to an embodiment of the present disclosure will be described below in conjunction with FIG. 3.

After receiving an original video, computing device 120 performs multi-level video abstract processing on the original video through architecture 300, and then performs video retrieval using method 200 after receiving a video retrieval request from client 110. That is, computing device 120 may extract image frames from the original video at different frame rates through architecture 300, and store the extracted image frames into corresponding video databases; and computing device 120 may further acquire the mapping relationship between the image frames and keywords describing the image frames through architecture 300. After receiving a retrieval request including a retrieval word from client 110, computing device 120 may retrieve the image frame associated with the retrieval word from the video database determined according to a retrieval level corresponding to the retrieval word based on the mapping relationship between the image frames and the keywords describing the image frames, and feed the retrieved image frame back to client 110.

Figure 3:
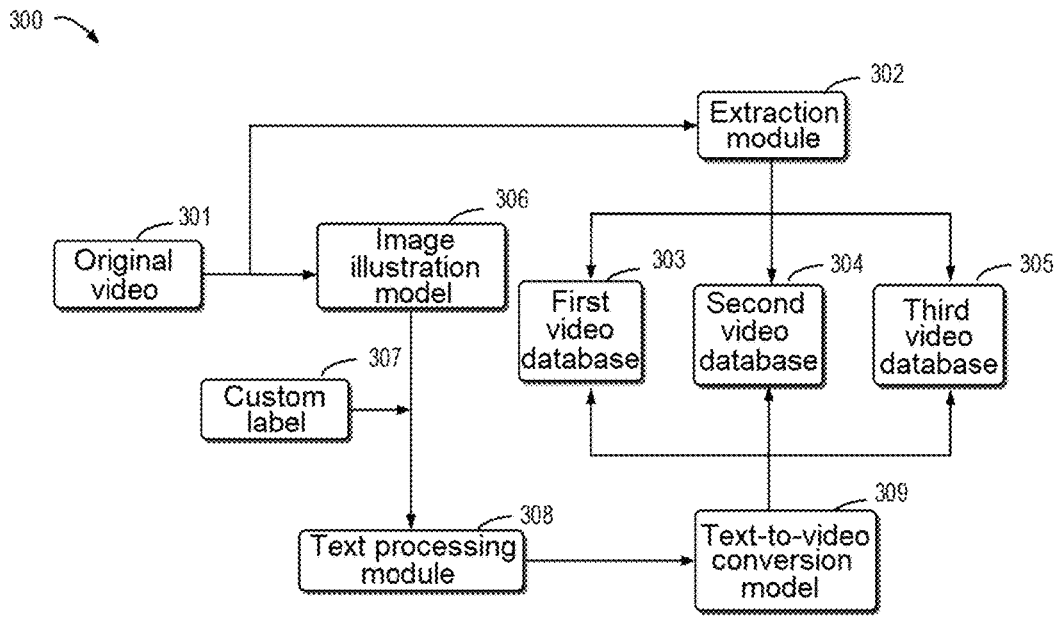
FIG. 3 illustrates an example architecture for multi-level video abstract according to an embodiment of the present disclosure.

In some embodiments, as shown in FIG. 3, architecture 300 may include extraction module 302, image illustration model 306, text processing module 308, and text-to-video conversion model 309.

After receiving original video 301, computing device 120 may extract image frames from original video 301 at different frame rates by means of extraction module 302, and store the extracted image frames into the corresponding video databases to obtain a plurality of video databases 130 corresponding to different retrieval levels, respectively.

In some embodiments, computing device 120 may use extraction module 302 to extract image frames from original video 301 for a first frame rate, and store the image frames extracted for the first frame rate into first video database 303; and computing device 120 may use extraction module 302 to extract image frames from original video 301 for a second frame rate, and store the image frames extracted for the second frame rate into second video database 304, so as to obtain the plurality of video databases 130 at least including first video database 303 and second video database 304. First video database 303 may correspond to a first retrieval level, and second video database 304 may correspond to a second retrieval level. An architecture of the extraction module will be specifically described below with reference to FIG. 4.

In some other embodiments, computing device 120 may also use extraction module 302 to extract image frames from original video 301 for a third frame rate, and store the image frames extracted for the third frame rate into third video database 305, so as to obtain the plurality of video databases 130 at least including first video database 303, second video database 304, and third video database 305. Third video database 305 may correspond to a third retrieval level.

As illustrated in FIG. 3, after receiving original video 301, computing device 120 may further use image illustration model 306 and text processing module 308 to acquire text features describing original video 301, and then use text-to-video conversion model 309 to process the image frames acquired for different frame rates to acquire the mapping relationship between the image frames acquired for the different frame rates and keywords describing the image frames.

In some embodiments, after receiving original video 301, computing device 120 may use image illustration model 306 to acquire text description of each of the image frames of original video 301, and delete repeated text in all the text description to generate a label used to describe the content of original video 301. Computing device 120 may acquire the text features of original video 301 by inputting the label of original video 301 into text processing module 308.

In some embodiments, after deleting the repeated text in all the text description, computing device 120 may further acquire custom label 307 of original video 301 input by the user, and a more complete label of original video 301 may be generated by combining the text description, from which the repeated text is deleted, with custom label 307.

In some embodiments, after acquiring the text features of original video 301, computing device 120 may input the text features of original video 301 and the image frames extracted for the different frame rates into the text-to-video conversion model 309, so as to obtain conversion results of the image frames for the different frame rates and the keywords describing the image frames, that is, the mapping relationship.

For example, computing device 120 may input the image frames in first video database 303 for the first frame rate and the text features of original video 301 into the text-to-video conversion model 309, so as to obtain conversion results of the image frames for the first frame rate and the keywords describing the image frames of the first frame rate. Computing device 120 may input the image frames in second video database 304 for the second frame rate and the text features of original video 301 into the text-to-video conversion model 309, so as to obtain conversion results of the image frames for the second frame rate and the keywords describing the image frames of the second frame rate.

For another example, computing device 120 may further input image frames in third video database 305 for the third frame rate and the text features of original video 301 into the text-to-video conversion model, so as to acquire conversion results of the image frame for the third frame rate and keywords describing the image frames of the third frame rate.

Figure 4:
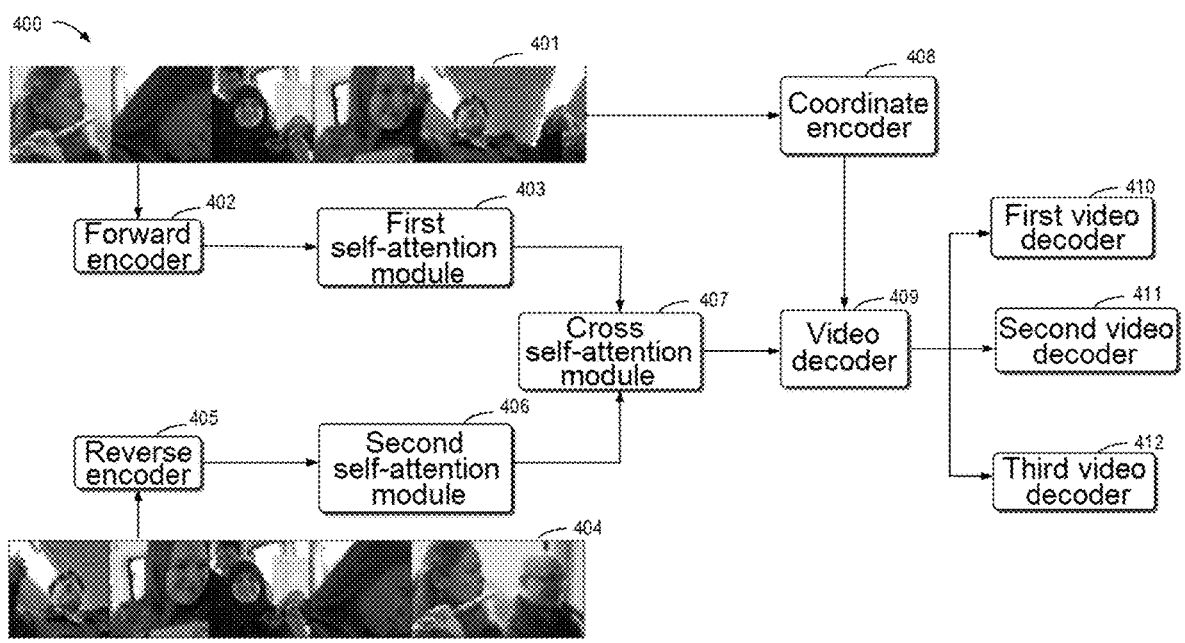
FIG. 4 illustrates an example architecture of an extraction model according to an embodiment of the present disclosure.

Example architecture of an extraction model 400 according to an embodiment of the present disclosure will be described below with reference to FIG. 4.

In some embodiments, extraction model 400 includes forward encoder 402 and reverse encoder 405. Computing device 120 may extract each of image frames of positive sequence video 401; and the image frames of the positive sequence video 401 are arranged in a reverse order according to a time sequence of the image frames to generate reverse sequence video 404. Computing device 120 may acquire forward frame features of the original video by inputting positive sequence video 401 into forward encoder 402; and computing device 120 may acquire reverse frame features of the original video by inputting reverse sequence video 404 into reverse encoder 405.

In some embodiments, extraction model 400 includes an attention model. Computing device 120 may acquire frame features of each of image frames of the video by inputting the forward frame features and the reverse frame features of the video into the attention model. The attention model is used to acquire relevant features of the same target object in each of the image frames of the video.

In some embodiments, the attention model includes first self-attention module 403, second self-attention module 406, and cross self-attention module 407. Computing device 120 may acquire first weighted features by inputting the forward frame features into first self-attention module 403, where first self-attention module 403 is used to learn relevant features of the same target object in positive sequence video 401. Computing device 120 may acquire second weighted features by inputting the reverse frame features into second self-attention module 406, where second self-attention module 406 is used to learn relevant features of the same target object in reverse sequence video 404. Computing device 120 may acquire global video features of the original video by inputting the first weighted features and the second weighted features into cross self-attention module 407.

Returning to FIG. 4, in some embodiments, extraction model 400 further includes coordinate encoder 408 and video decoder 409. Computing device 120 may acquire coordinate code of the original video by inputting the original video into coordinate encoder 408 and based on the time sequence of the image frames of the original video. Computing device 120 may acquire frame features of each of the image frames of the original video by inputting the global video features and the coordinate code into video decoder 409.

In some embodiments, extraction model 400 further includes first video decoder 410 and second video decoder 411. For example, by inputting the frame features of each of the image frames of the original video into first video decoder 410, computing device 120 may acquire the frame features of the image frames for the first frame rate from the frame features of each of the image frames of the original video, and time sequence numbers of the image frames for the first frame rate in the original video. By inputting the frame features of each of the image frames of the original video into second video decoder 411, computing device 120 may acquire the frame features of the image frames for the second frame rate from the frame features of each of the image frames of the original video, and time sequence numbers of the image frames for the second frame rate in the original video.

In some embodiments, extraction model 400 further includes third video decoder 412. For example, by inputting the frame features of each of the image frames of the original video into third video decoder 412, computing device 120 may acquire the frame features of the image frames for the first frame rate from the frame features of each of the image frames of the original video, and time sequence numbers of the image frames for the third frame rate in the original video.

Schematic diagram of a text-to-video conversion model 500 according to an embodiment of the present disclosure will be described below with reference to FIG. 5.

In some embodiments, conversion results 504 of image frames 501 and keywords describing image frame 501 can be acquired by inputting extracted image frames 501, frame features 502 of the extracted image frames, and text features 503 of the original video into text-to-video conversion model 500.

Figure 5:
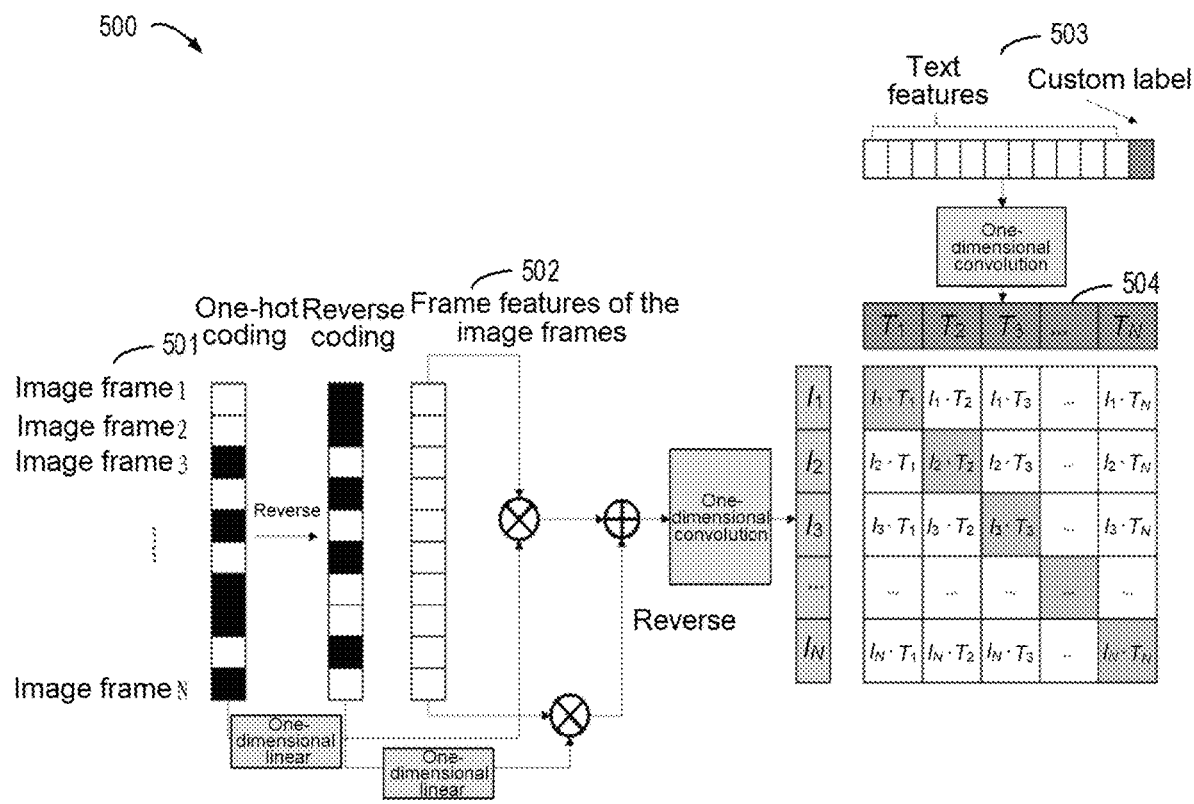
FIG. 5 illustrates a schematic diagram of a text-to-video conversion model according to an embodiment of the present disclosure.

Referring to FIG. 3 and FIG. 5, in some embodiments, after acquiring the image frames for the first frame rate, computing device 120 uses text-to-video conversion model 500 to acquire conversion results 504 of the image frames for the first frame rate and the keywords describing the image frames. After acquiring the image frames for the second frame rate, computing device 120 uses text-to-video conversion model 500 to acquire conversion results 504 of the image frames for the second frame rate and the keywords describing the image frames. After acquiring the image frames for the third frame rate, computing device 120 uses text-to-video conversion model 500 to acquire conversion results 504 of the image frames for the third frame rate and the keywords describing the image frames.

In some embodiments, after image frames 501, frame features 502 of the image frames, and text features 503 of the original video are input, text-to-video conversion model 500 may encode image frames 501 (for example, in a one-hot coding mode) to acquire an encoding result, and reversely encode the encoding result of image frames 501 to acquire a reverse encoding result. One-dimensional linear computing is performed on the encoding result (for example a one-hot coding result) of the image frames, and a computing result is multiplied by frame features 502 of the image frames to obtain third weighted features. One-dimensional linear computing is performed on the reverse encoding result, and a computing result is multiplied by frame features 502 of the image frames to obtain fourth weighted features. Fifth weighted features may be acquired by adding the third weighted features and the fourth weighted features together, and performing one-dimensional convolution computing on the same. Sixth weighted features may be acquired by performing one-dimensional convolution computing on text features 503 of the original video. According to the fifth weighted features and the sixth weighted features, computing device 120 may acquire conversion results 504 of the image frames and the keywords describing the image frames, that is, each of the image frames has the keyword that can best reflect content of the image frame. The image frame corresponding to the keyword may be acquired according to the keyword.

In some embodiments, the text-to-video conversion model may be trained with training image frames of a training video, frame features of the training image frames, and text features of the training video as sample input and taking conversion results of the training image frames and keywords describing the training image frames as sample output, to generate the text-to-video conversion model.

In some embodiments, when training the text-to-video conversion model, after the sample output of the conversion results of the training image frames and the keywords describing the training image frames is acquired, a loss function between the sample output and a threshold matrix may be computed, where the threshold matrix is a matrix of which values on diagonals are 1 and remaining values are 0. When the value of the loss function is greater than 0, parameter optimization is performed on the text-to-video conversion model until the value of the loss function is infinitely close to 0, that is, the output conversion results are infinitely close to the threshold matrix, so as to generate the text-to-video conversion model.

Figure 6:
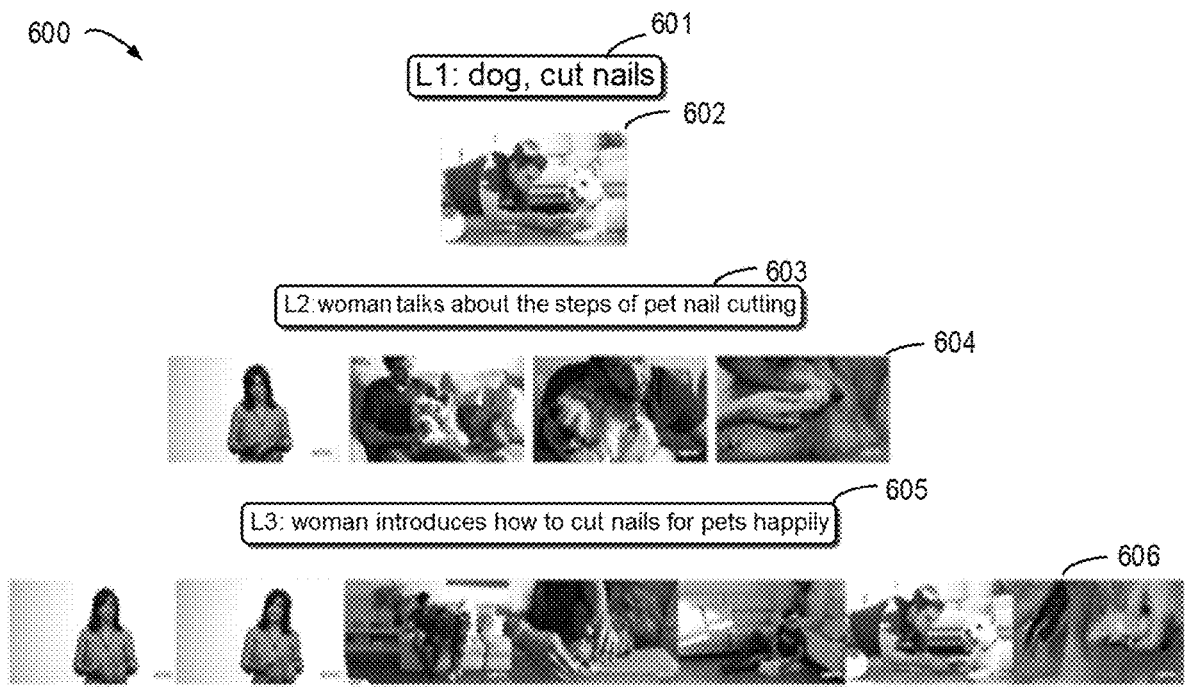
FIG. 6 illustrates a schematic diagram for performing multi-level video retrieval based on the method described by the present disclosure.

FIG. 6 illustrates schematic diagram 600 for performing multi-level video retrieval based on a method according to an embodiment of the present disclosure. As shown in FIG. 6, when retrieval word "dog" and "cut nails" 601 of a retrieval level L1 is input, an image frame may be retrieved from a first video database corresponding to the retrieval level L1, and retrieved image frame 602 associated with "dog" and "cut nails" 601 may be fed back to a user. When retrieval word "woman talks about the steps of pet nail cutting" 603 of a retrieval level L2 is input, image frames may be retrieved from a second video database corresponding to the retrieval level L2, and retrieved image frames 604 associated with "woman talks about the steps of pet nail cutting" 603 may be fed back to the user. When retrieval word "woman introduces how to cut nails for pets happily" 605 of a retrieval level L3 is input, image frames may be retrieved from a third video database corresponding to the retrieval level L3, and retrieved image frames 606 associated with "woman introduces how to cut nails for pets happily" 605 may be fed back to the user.

Figure 7:
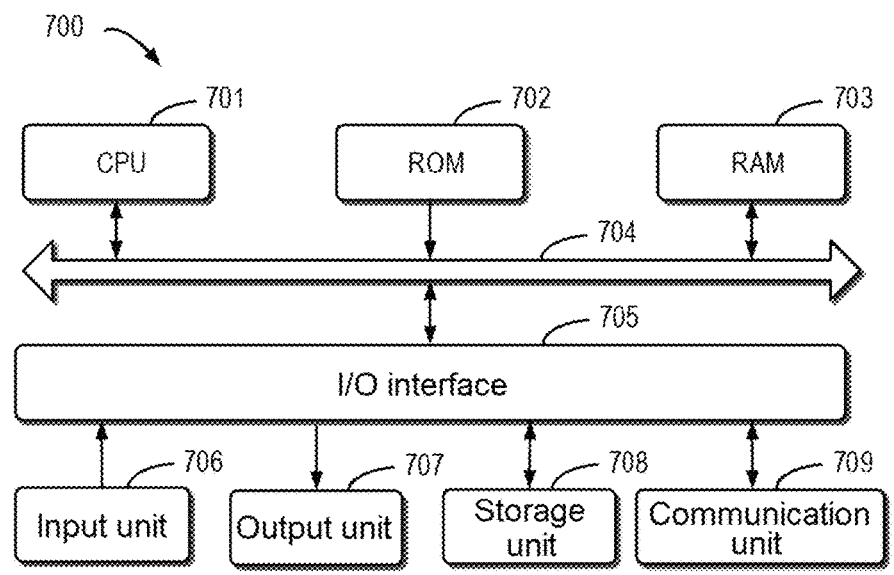
FIG. 7 illustrates a schematic block diagram of an example device suitable for implementing an embodiment of the present disclosure.

FIG. 7 illustrates schematic block diagram of device 700 that may be used to implement embodiments of the present disclosure. Device 700 may be a device or apparatus as described in embodiments of the present disclosure. As shown FIG. 7, device 700 includes central processing unit (CPU) 701, which may execute various appropriate actions and processing in accordance with computer program instructions stored in read-only memory (ROM) 702 or computer program instructions loaded from storage unit 708 into random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704. Although not shown in FIG. 7, device 700 may also include a co-processor.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various methods or processes described above may be performed by CPU 701. For example, in some embodiments, the method 200 may be implemented as a computer software program that is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments and their associated technical improvements, so as to enable those of ordinary skill in the art to understand the various embodiments disclosed herein.

What is claimed is:

1. A method for video retrieval, comprising:
   determining a retrieval level corresponding to a retrieval word in response to receiving a retrieval request comprising the retrieval word from a client;
   determining a video database corresponding to the retrieval level among a plurality of video databases, wherein the plurality of video databases store image frames for different frame rates of the same video, with a first one of the plurality of video databases corresponding to a first retrieval level storing image frames extracted from the same video at a first frame rate and a second one of the plurality of video databases corresponding to a second retrieval level different than the first retrieval level storing image frames extracted from the same video at a second frame rate different than the first frame rate;
   retrieving an image frame associated with the retrieval word from the determined video database; and
   sending the retrieved image frame to the client.

2. The method according to claim 1, wherein determining the retrieval level corresponding to the retrieval word comprises:
   determining the retrieval level corresponding to the retrieval word among a plurality of retrieval levels;
   wherein the plurality of retrieval levels at least comprise the first retrieval level and the second retrieval level, the first video database corresponding to the first retrieval level stores image frames for the first frame rate of the same video, the second video database corresponding to the second retrieval level stores image frames for the second frame rate of the same video, and the quantity of the image frames for the first frame rate of the same video is less than the quantity of the image frames for the second frame rate of the same video.

3. The method according to claim 2, wherein the retrieval levels further comprise a third retrieval level, and a third video database corresponding to the third retrieval level stores image frames for a third frame rate of the same video, wherein the quantity of the image frames for the second frame rate of the same video is less than the quantity of the image frames for the third frame rate of the same video.

4. The method according to claim 1, wherein retrieving the image frame associated with the retrieval word from the determined video database comprises:
   determining a keyword associated with the retrieval word; and
   retrieving an image frame corresponding to the keyword from the determined video database.

5. The method according to claim 1, further comprising:
   extracting image frames at the first frame rate and extracting image frames at the second frame rate from a received video; and
   storing the extracted image frames of the first frame rate into the first video database, and storing the extracted image frames of the second frame rate into the second video database.

6. The method according to claim 5, wherein extracting the image frames at the first frame rate and extracting the image frames at the second frame rate from the received video comprises:
   extracting each of the image frames of the video;
   arranging each of the image frames of the video in a reverse order to generate a reverse sequence video; and
   separately acquiring the image frames for the first frame rate and the image frames for the second frame rate by inputting the video and the reverse sequence video into an extraction model.

7. The method according to claim 6, wherein the extraction model comprises an attention model, and separately acquiring the image frames for the first frame rate and the image frames for the second frame rate by inputting the video and the reverse sequence video into the extraction model comprises:
   inputting the video and the reverse sequence video;
   acquiring frame features of each of the image frames of the video with the attention model, wherein the attention model is used to acquire relevant features of the same target object in each of the image frames of the video; and
   acquiring frame features of the image frames for the first frame rate from the frame features of each of the image frames of the video with a first decoder, and acquiring frame features of the image frames for the second frame rate from the frame features of each of the image frames of the video with a second decoder.

8. The method according to claim 7, wherein the extraction model further comprises a forward encoder, a reverse encoder, a coordinate encoder, and a video decoder, and the attention model comprises a first self-attention module, a second self-attention module, and a cross self-attention module;
   by inputting the video and the reverse sequence video, acquiring the frame features of each of the image frames of the video with the attention model comprises:
   acquiring forward frame features of the video by inputting the video into the forward encoder;
   acquiring reverse frame features of the video by inputting the reverse sequence video into the reverse encoder;
   inputting the forward frame features into the first self-attention module to acquire first weighted features;
   inputting the reverse frame features into the second self-attention module to acquire second weighted features;

inputting the first weighted features and the second weighted features into the cross self-attention module to acquire global video features of the video;

inputting the video into the coordinate encoder to acquire coordinate code of the video; and inputting the global video features and the coordinate code into the video decoder to acquire the frame features of each of the image frames of the video.

9. The method according to claim 5, further comprising:

inputting the image frames for the first frame rate and text features of the video into a text-to-video conversion model to acquire conversion results of the image frames for the first frame rate and keywords describing the image frames of the first frame rate; and inputting the image frames for the second frame rate and text features of the video into the text-to-video conversion model to acquire conversion results of the image frames for the second frame rate and keywords describing the image frames of the second frame rate.

10. The method according to claim 9, further comprising:

training the text-to-video conversion model with training image frames of a training video, frame features of the training image frames, and text features of the training video as sample input and taking conversion results of the training image frames and the keywords describing the training image frames as sample output to generate the text-to-video conversion model.

11. The method according to claim 9, further comprising:

inputting the video into an image illustration model to generate text description of each of image frames of the video;

deleting repeated text in the text description to generate a label of the video; and acquiring the text features of the video by inputting the label of the video into a text processing model.

12. The method according to claim 11, wherein the label of the video comprises a custom label input by a user.

13. An electronic device, comprising:

a processor; and a memory coupled to the processor, wherein the memory has instructions stored therein which, when executed by the processor, cause the electronic device to perform actions comprising:

determining a retrieval level corresponding to a retrieval word in response to receiving a retrieval request comprising the retrieval word from a client;

determining a video database corresponding to the retrieval level among a plurality of video databases, wherein the plurality of video databases store image frames for different frame rates of the same video, with a first one of the plurality of video databases corresponding to a first retrieval level storing image frames extracted from the same video at a first frame rate and a second one of the plurality of video databases corresponding to a second retrieval level different than the first retrieval level storing image frames extracted from the same video at a second frame rate different than the first frame rate;

retrieving an image frame associated with the retrieval word from the determined video database; and sending the retrieved image frame to the client.

14. The electronic device according to claim 13, wherein determining the retrieval level corresponding to the retrieval word comprises:

determining the retrieval level corresponding to the retrieval word among a plurality of retrieval levels;

wherein the plurality of retrieval levels at least comprise the first retrieval level and the second retrieval level, the first video database corresponding to the first retrieval level stores image frames for the first frame rate of the same video, the second video database corresponding to the second retrieval level stores image frames for the second frame rate of the same video, and the quantity of the image frames for the first frame rate of the same video is less than the quantity of the image frames for the second frame rate of the same video.

15. The electronic device according to claim 13, wherein retrieving the image frame associated with the retrieval word from the determined video database comprises:

determining a keyword associated with the retrieval word; and retrieving an image frame corresponding to the keyword from the determined video database.

16. The electronic device according to claim 13, wherein the actions further comprise:

extracting image frames at the first frame rate and extracting image frames at the second frame rate from a received video; and storing the extracted image frames of the first frame rate into the first video database, and storing the extracted image frames of the second frame rate into the second video database.

17. The electronic device according to claim 16, wherein extracting the image frames at the first frame rate and extracting the image frames at the second frame rate from the received video comprises:

extracting each of the image frames of the video;

arranging each of the image frames of the video in a reverse order to generate a reverse sequence video; and separately acquiring the image frames for the first frame rate and the image frames for the second frame rate by inputting the video and the reverse sequence video into an extraction model.

18. The electronic device according to claim 17, wherein the extraction model comprises an attention model, and separately acquiring the image frames for the first frame rate and the image frames for the second frame rate by inputting the video and the reverse sequence video into the extraction model comprises:

inputting the video and the reverse sequence video;

acquiring frame features of each of the image frames of the video with the attention model, wherein the attention model is used to acquire relevant features of the same target object in each of the image frames of the video; and acquiring frame features of the image frames for the first frame rate from the frame features of each of the image frames of the video with a first decoder, and acquiring frame features of the image frames for the second frame rate from the frame features of each of the image frames of the video with a second decoder.

19. The electronic device according to claim 18, wherein the extraction model further comprises a forward encoder, a reverse encoder, a coordinate encoder, and a video decoder, and the attention model comprises a first self-attention module, a second self-attention module, and a cross self-attention module;

by inputting the video and the reverse sequence video, acquiring the frame features of each of the image frames of the video with the attention model comprises:

acquiring forward frame features of the video by inputting the video into the forward encoder;

acquiring reverse frame features of the video by inputting the reverse sequence video into the reverse encoder;
inputting the forward frame features into the first self-attention module to acquire first weighted features;
inputting the reverse frame features into the second self-attention module to acquire second weighted features;
inputting the first weighted features and the second weighted features into the cross self-attention module to acquire global video features of the video;
inputting the video into the coordinate encoder to acquire coordinate code of the video; and
inputting the global video features and the coordinate code into the video decoder to acquire the frame features of each of the image frames of the video.

20. A computer program product tangibly stored on a non-transitory computer-readable medium and comprising machine-executable instructions, wherein the machine-executable instructions, when executed by a machine, cause the machine to:

determine a retrieval level corresponding to a retrieval word in response to receiving a retrieval request comprising the retrieval word from a client;
determine a video database corresponding to the retrieval level among a plurality of video databases, wherein the plurality of video databases store image frames for different frame rates of the same video, with a first one of the plurality of video databases corresponding to a first retrieval level storing image frames extracted from the same video at a first frame rate and a second one of the plurality of video databases corresponding to a second retrieval level different than the first retrieval level storing image frames extracted from the same video at a second frame rate different than the first frame rate;
retrieve the image frame associated with the retrieval word from the determined video database; and
send the retrieved image frame to the client.

* * * * *